United States Patent
Rogers et al.

(10) Patent No.: US 7,110,391 B1
(45) Date of Patent: Sep. 19, 2006

(54) TRANSPORTING TELEPHONY SIGNALING OVER A DATA NETWORK

(75) Inventors: Shane M. Rogers, Calgary (CA); Lyle R. Button, Calgary (CA); Timothy A. Kuechler, Calgary (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/517,903

(22) Filed: Mar. 3, 2000

(51) Int. Cl.
  *H04L 12/66* (2006.01)
  *H04J 3/16* (2006.01)

(52) U.S. Cl. .................... 370/352; 370/466

(58) Field of Classification Search ........ 370/351–356, 370/466, 402, 463, 465, 526, 252; 379/286, 379/283, 351, 90.01, 93.01–93.08, 93.09, 379/93.15, 93.26
See application file for complete search history.

(56) References Cited

U.S. PATENT DOCUMENTS

| | | | |
|---|---|---|---|
| 4,467,473 A | 8/1984 | Arnon et al. | |
| 4,472,800 A | 9/1984 | Krym et al. | |
| 4,476,558 A | 10/1984 | Arnon | |
| 5,073,923 A | 12/1991 | Offers et al. | |
| 5,136,585 A * | 8/1992 | Nizamuddin et al. .. | 379/210.05 |
| 5,345,495 A * | 9/1994 | Black et al. ............. | 379/27.01 |
| 5,594,732 A * | 1/1997 | Bell et al. ................... | 370/401 |
| 5,659,542 A * | 8/1997 | Bell et al. ................... | 370/522 |
| 5,666,357 A * | 9/1997 | Jangi .......................... | 370/466 |
| 5,991,293 A | 11/1999 | Buchanan et al. | |
| 6,078,582 A * | 6/2000 | Curry et al. ................ | 370/352 |
| 6,226,303 B1 * | 5/2001 | Levens et al. .............. | 370/526 |
| 6,243,373 B1 * | 6/2001 | Turock ........................ | 370/352 |
| 6,259,691 B1 * | 7/2001 | Naudus ....................... | 370/352 |
| 6,275,573 B1 * | 8/2001 | Naor et al. ............. | 379/207.02 |
| 6,298,055 B1 * | 10/2001 | Wildfeuer ................... | 370/352 |
| 6,363,065 B1 * | 3/2002 | Thornton et al. ........... | 370/352 |
| 6,385,192 B1 * | 5/2002 | Kozdon et al. ............. | 370/352 |
| 6,389,010 B1 * | 5/2002 | Kubler et al. ............... | 370/353 |
| 6,438,124 B1 * | 8/2002 | Wilkes et al. ............... | 370/352 |
| 6,445,695 B1 * | 9/2002 | Christie, IV ................ | 370/352 |
| 6,453,034 B1 | 9/2002 | Donovan et al. | |
| 6,470,020 B1 * | 10/2002 | Barker et al. ............... | 370/352 |
| 6,480,588 B1 | 11/2002 | Donovan | |
| 6,487,196 B1 * | 11/2002 | Verthein et al. ............ | 370/352 |
| 6,515,996 B1 | 2/2003 | Tonnby et al. | |

(Continued)

FOREIGN PATENT DOCUMENTS

EP           0880259 A2 * 11/1998

OTHER PUBLICATIONS

U.S. Appl. No. 09/222,882, Entitled "Accessory Resource Arbitration for Stimulus Telephone", filed Dec. 30, 1998.

(Continued)

*Primary Examiner*—Steven Nguyen
(74) *Attorney, Agent, or Firm*—Trop, Pruner & Hu, P.C.

(57) ABSTRACT

A telephony system includes a packet-based data network that is coupled to various network elements. The network elements include interface devices that are coupled to corresponding stimulus devices. The stimulus devices may include stimulus telephones or a telephone exchange system. Each interface device receives a stimulus message from a corresponding stimulus device. The stimulus message is encapsulated by the interface device into a packet, such as an Internet Protocol (IP) packet. The packet is communicated across the data network to the target device, which may be another interface device. At the receiving end, the interface device receives the packet, decapsulates the packet to retrieve the stimulus message, and sends the stimulus message to a corresponding stimulus device.

45 Claims, 7 Drawing Sheets

U.S. PATENT DOCUMENTS

| | | | |
|---|---|---|---|
| 6,529,499 B1 | 3/2003 | Doshi et al. | |
| 6,549,621 B1 | 4/2003 | Christie, IV et al. | 379/230 |
| 6,553,023 B1 * | 4/2003 | Yamamiya et al. | 370/352 |
| 6,574,335 B1 * | 6/2003 | Kalmanek et al. | 379/88.12 |
| 6,577,638 B1 * | 6/2003 | Tashiro et al. | 370/352 |
| 6,584,093 B1 | 6/2003 | Salama et al. | |
| 6,584,186 B1 | 6/2003 | Aravamudan et al. | |
| 6,584,490 B1 | 6/2003 | Schuster | |
| 6,636,528 B1 * | 10/2003 | Korpi et al. | 370/466 |
| 6,658,020 B1 * | 12/2003 | Isaka et al. | 370/352 |
| 6,711,166 B1 * | 3/2004 | Amir et al. | 370/395.52 |
| 6,771,637 B1 | 8/2004 | Suzuki et al. | |

OTHER PUBLICATIONS

Calista Ltd., "User Guide For PBX over IP Solo," pp. 1-17 (1998).

Calista, Ltd, "PBXoverIP Solutions," pp. 1-3 (1999).

Calista, Ltd., "IP-Enabling the Digital PBX," printed from http//www.calista.com/PoIPDatasht.htm, pp. 1-4 (Apr. 1999).

Calista, Ltd. "Calista Wins 'Best of Show,' Award for PBXoverIP Solo at Ct Expo/Demo Fall '98," printed from http://www.calista.com/calista_wins.htm, pp. 1-2 (Apr. 1999).

Calista, Ltd. "Products: Voice over IP: How to Connect," printed from http://www.calista.com/products/voip/pbx.solo/connect.html, p. 1 (Aug. 1999).

* cited by examiner

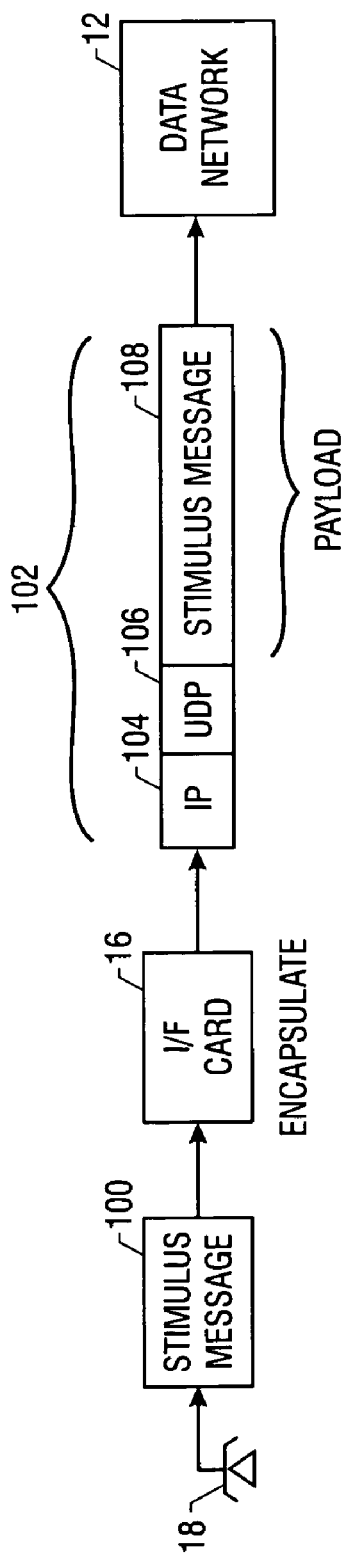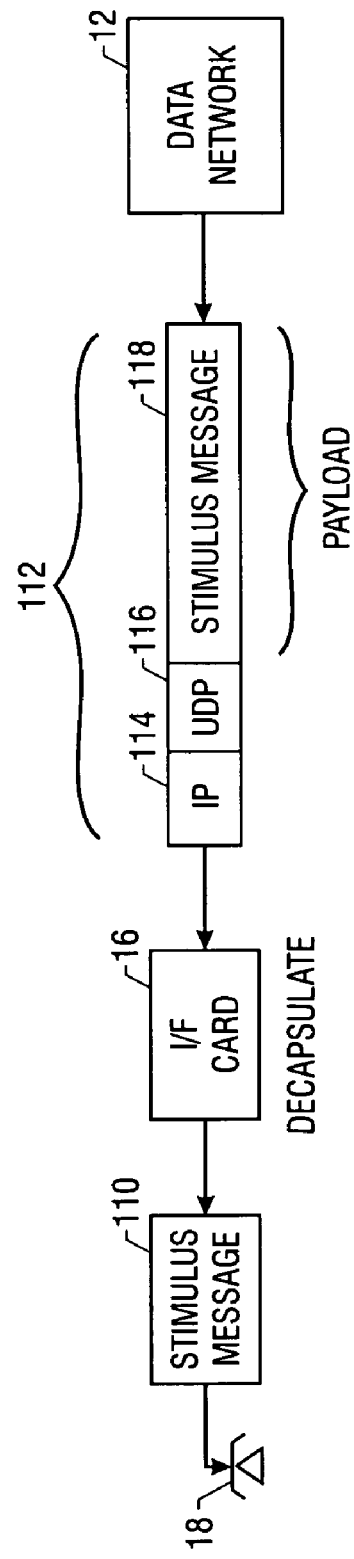
FIG. 3A
FIG. 3B

TRANSPORTING TELEPHONY SIGNALING OVER A DATA NETWORK

BACKGROUND

The invention relates to transporting telephony signaling, such as stimulus messages for a digital telephone, over a data network.

Private telephony exchange systems may include private branch exchange (PBX) systems, key telephone systems, and Centrex systems (in which a central office exchange provides PBX-like switching for a special line group). Typically, a private telephone exchange system is characterized by a simplified number plan that identifies extensions by five or less digit numbers, depending upon the size of the exchange system. This is in contrast to a minimum of seven digits (or even ten) typically employed for a directory number serviced by a public central office exchange. Private telephone exchange systems may also offer other services, such as voice mail, intercom, message waiting indication, and other features.

A private telephone exchange system includes interface circuits (e.g., line cards of a PBX system) to communicate with various telephony devices, which may include digital telephones. Native stimulus messages may be exchanged between the telephones (which may also be referred to as "stimulus telephones") and the private telephone exchange system for performing calls. The types of stimulus messages that are exchanged between a stimulus telephone and the private telephone system includes the stimulus telephone reporting key press and hook state events to the switch system, and the switch system communicating commands to the stimulus telephone to cause activation of the telephone's ringer, control of the telephone's display, and activation and connection of the telephone's handset to the audio path. The stimulus telephones are connected to the exchange system over a number of corresponding lines. A feature offered by the private telephone exchange system is that the number of lines coupling the telephones may exceed the number of central office lines that the exchange system is coupled to. Thus, a first number of central office lines may be shared by a second number of telephones through the telephone exchange system, with the second number typically much larger than the first number.

Stimulus telephones rely on the telephone exchange system for performing various functions. As such, stimulus telephones are not provided with much intelligence. However, advantages of stimulus telephones are that they are relatively cheap to manufacture and are not complex.

One type of interface between a stimulus telephone and a private telephone exchange system employs a time compression multiplex (TCM) technique on a half-duplex transmission link, in which a burst mode or ping-pong approach is used. Typically, in the TCM link, the digital information signal to be transmitted is divided into discrete portions, with each portion time compressed to form a "burst" that occupies less than one half the time of the original portion. The transmitter at each terminal connected to the TCM link alternately transmits the burst onto the link, following which the associated receiver at each terminal can receive a corresponding burst from the other transmitter. On receipt, each burst is expanded to occupy its original time span. Externally, the system appears to be transmitting the two digital information streams continuously and simultaneously (full-duplex communication).

Other types of interfaces exist for carrying stimulus messages between a stimulus telephone and a private telephone exchange system. Such interfaces are typically proprietary and may differ depending on the manufacturer of the telephone exchange system and stimulus telephones.

One limitation of private telephone exchange systems is that they may be limited in geographical reach. Thus, typically, a private telephone exchange system is employed at a location in which telephone sets are relatively close to the telephone exchange system. As the size of a facility grows, additional private telephone exchange systems may be added to increase capacity and to provide service for different segments of the facility.

However, private telephone exchange systems usually do not reach remote sites (such as remote office location or a home office location) using conventional links between stimulus telephones and the private telephone exchange system. For such remote locations, different setups are typically provided. In the home office location, for example, the user may subscribe to a dedicated central office line for communicating over the public switched telephone network (PSTN). At a remote office location having a relatively low number of users, a separate exchange system such as a key telephone system may be employed to support those users. With either the dedicated central office line or separate telephone exchange system approach, however, users are not hooked into the one or more private telephone exchange systems at the main office location. This prevents convenient user access to various features offered by such private telephone exchange systems, such as voice mail, extension dialing using a reduced number of digits, and intercom features.

Another issue associated with private telephone exchange systems is that dedicated telephone lines are typically required to connect the stimulus telephones to the telephone exchange system. Such telephone lines are usually in addition to cables that are run for a local area network (LAN) to provide data services. A LAN is typically coupled to computers, servers, gateways, routers, and other devices to enable data communications over the LAN between the network elements. The presence of separate lines for telephony services and for data services may be associated with increased costs.

A need thus exists for an improved method and apparatus of coupling telephony devices such as stimulus telephones to a telephone exchange system.

SUMMARY

In general, according to one embodiment, an apparatus for use in a telephony system includes a digital interface to communicate with a stimulus device and a packet interface to communicate with a packet-based network. A controller receives stimulus control information from the digital interface and encapsulates the stimulus control information into one or more packets for transmission over the packet-based network through the packet interface.

Some embodiments of the invention may include one or more of the following advantages. By using a packet-based data network to communicate stimulus messages exchanged between stimulus telephones and a telephone exchange system, dedicated lines for telephony services that are separate from the packet-based communications lines can be avoided or reduced. This may reduce costs associated with setting up an office facility. Using packet-based data networks may also facilitate the linking of stimulus telephones at remote locations, such as remote office sites or home office locations, to the main office telephone exchange system.

Other features and advantages will become apparent from the following description, from the drawings, and from the claims.

BRIEF DESCRIPTION OF THE DRAWINGS

FIGS. 3A–3B illustrate the communications of stimulus messages between a stimulus telephone and a packet-based data network in accordance with one embodiment.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible. For example, although reference is made to the various communications protocols or standards, other embodiments may include other types of communications protocols or standards.

Figure 1A:
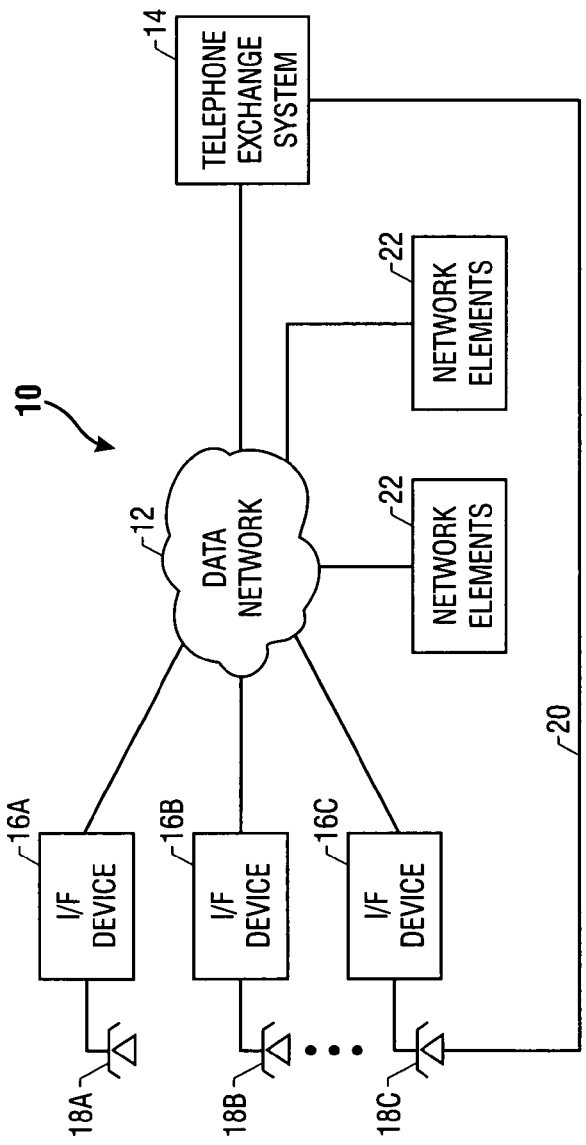
FIG. 1A is a block diagram of an embodiment of a telephony system.

Referring to FIG. 1A, a telephony system 10 includes a packet-based data network 12 to which various network elements may be coupled. The network elements may include a private telephone exchange system, such as a private branch exchange (PBX) system or a key telephone system. Other network elements that may be coupled to the data network 12 include interface devices 16A, 16B, and 16C, that are in turn coupled to preselected ports of stimulus telephones 18A, 18B, and 18C, respectively. Other end user devices instead of the stimulus telephones 18A, 18B, and 18C may be employed in other arrangements. Such other end user devices may include speaker phones, conference phones, and any other device that enables voice communications. The telephones 18A, 18B, and 18C and such other devices may be generally referred to as "stimulus devices."

In accordance with some embodiments, the interface devices 16A, 16B, and 16C encapsulate stimulus messages for communication over the data network 12 from the stimulus telephones 18 to the telephone exchange system 14. In the reverse direction, the interface devices 16A, 16B, and 16C decapsulate messages received over the data network 12 into stimulus messages for communication to respective stimulus telephones 18A, 18B, and 18C. In one embodiment, the telephone exchange system 14 is data network-enabled and may be directly coupled to the data network 12 through internal interface circuits.

Figure 2:
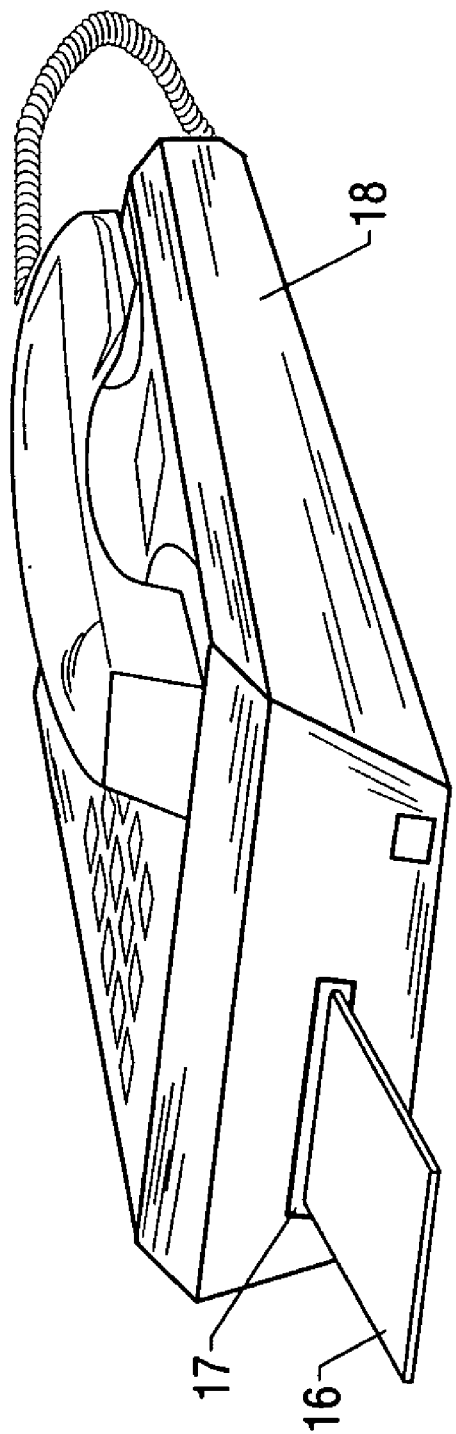
FIG. 2 illustrates a stimulus telephone and an interface device coupled to the stimulus telephone in accordance with an embodiment.

Referring to FIG. 2, the stimulus telephone 18 (one of 18A, 18B, and 18C) may provide a port, slot, or receptacle 17 for receiving an interface device 16 (one of 16A, 16B, and 16C). The interface device in the illustrated embodiment is in the form of a card having a connector to couple to a corresponding connector of the receptacle 17. Alternatively, the interface device 16 may be a separate module coupled to a port of the telephone 18 by a cable.

In the example arrangement shown in FIG. 1A, the stimulus telephone 18C may include a second port that may couple the stimulus telephone 18C directly over a link 20 to the telephone exchange system 14. Such a link 20 may be a time compression multiplex (TCM) link, for example. Other types of links between the stimulus telephone 18C and the PBX 14 may be employed in further embodiments, with the interfaces between the stimulus telephone 18C and the telephone exchange system 14 depending upon the manufacturer of the equipment. The other stimulus telephones 18A and 18B in the telephony system 10 may include similar ports for coupling the stimulus telephones 18A and 18B directly to the telephone exchange system 14.

As used here, a "data network" or "network" may refer to one or more communications networks, channels, links, or paths, and systems or devices (such as routers) used to route data over such networks, channels, links, or paths. The packet-based data network 12 may include a packet-switched data network such as an Internet Protocol (IP) network over which packets, datagrams, or other units of data are communicated. One version of IP is described in Request for Comments (RFC) 791, entitled "Internet Protocol," dated September 1981. Other versions of IP, such as IPv6, or other connectionless, packet-switched standards may also be utilized in further embodiments. A version of IPv6 is described in RFC 2460, entitled "Internet Protocol, Version 6 (IPv6) Specification," dated December 1998.

Unlike circuit-switched networks, which provide a dedicated end-to-end connection or physical path for the duration of a call, a packet-switched network is one in which the same path may be shared by several network elements. Packet-switched networks such as IP networks are based on a connectionless internetwork layer. Packets or other units of data injected into a packet-switched data network may travel independently over any path (and possibly over different paths) to a destination point. The packets may even arrive out of order. Routing of the packets is based on one or more addresses carried in each packet.

Packet-based data networks may also include connection-oriented networks, such as Asynchronous Transfer Mode (ATM) and Frame Relay networks. In a connection-oriented packet-based network, a virtual circuit or connection is established between two end points. In such connection-oriented networks, packets are received in the same order in which they were transmitted.

In addition to the interface devices 16 and the telephone exchange system 14, the packet-based data network 12 may also be used to link other types of network elements (22), such as personal computers, servers, gateways, network telephones, and so forth. The data network 12 may include private networks (such as local area networks or wide area networks) and public networks (such as the Internet). Popular forms of communications between network elements across the packet-based data network 12 include electronic mail, file transfer, web browsing, and other exchanges of data. In accordance with one embodiment, the data network 12 is also employed to communicate stimulus messages encapsulated in packets that are communicated between the interface devices 16A, 16B, 16C, and the telephone exchange system 14.

Figure 1B:
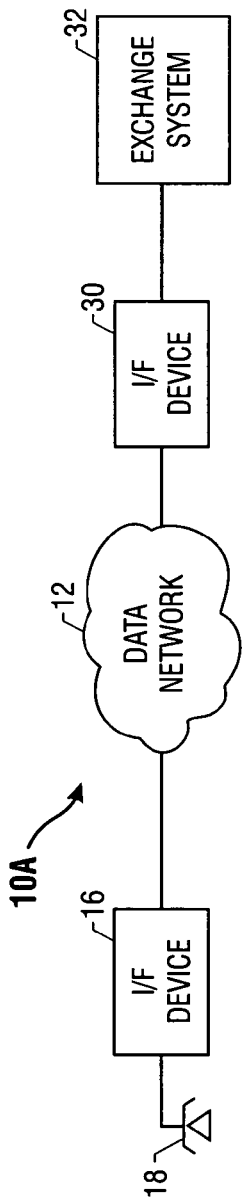
FIG. 1B is a block diagram of another embodiment of a telephony system.

FIG. 1B illustrates a telephony system 10A in accordance with another embodiment. In this embodiment, a telephone exchange system 32 is a legacy system not capable of communicating over the data network 12. An interface device 30, in the form of a line card, for example, may be inserted into an appropriate slot or receptacle in the telephone exchange system 32 that transmits and receives stimulus messages. Conventionally, the slot or receptacle of the telephone exchange system 32 is used to communicate stimulus messages with stimulus telephones. The interface device 30 performs tasks similar to those of the interface device 16, including encapsulating stimulus commands from the telephone exchange system 32 and decapsulating packets received over the data network 12 from the interface device 16. Thus, the term "stimulus device" may also refer to telephone exchange systems such as the telephone exchange system 22.

Referring to FIGS. 3A and 3B, the processes of converting between a stimulus message and a packet capable of being communicated over the data network 12 are illustrated. FIG. 3A shows conversion of a stimulus message 100 into a packet 102, while FIG. 3B shows the conversion of a packet 112 into a stimulus message 110.

As shown in FIG. 3A, the stimulus telephone 18 generates a stimulus message 100 that is communicated to the interface device 16 according to a stimulus protocol. The stimulus message is also in a predetermined stimulus language. The interface card 16 then encapsulates the stimulus message 100 in the predetermined stimulus language into the payload section 108 of a packet 102, which may be an IP packet. The IP packet 102 includes the payload section 108, an IP header 104, and a UDP (User Datagram Protocol) header 106. UDP is described in RFC 768, entitled "User Datagram Protocol," dated August 1980. UDP is a transport layer for controlling connection between network elements over an IP network. The packet 102 is then communicated to the data network 12, targeted to a network element having a destination address specified in the IP header (the IP destination address).

In accordance with some embodiments, the stimulus message 100 is simply encapsulated into the packet 102. As used here, "encapsulate" refers to a process in which a message is placed into a payload section of a predefined packet. No translation of the stimulus message 100 into a different, predetermined format or language is performed. Instead, the stimulus message remains in the original stimulus language, with packet header information (including the IP header 104 and the UDP header 106) added to enable packet communication over the data network 12. In some embodiments, the stimulus message as incorporated into the payload section of the packet remains unchanged. However, in other embodiments, some scrambling may be performed, such as for security or other reasons. Scrambling is distinguishable from translation into a different language or protocol in that, at the receiving end, a scrambled message may be descrambled without knowing the content of the message. Alternatively, a network security protocol is used to protect the packet 102 from unauthorized access, appropriate security header and trailer information may be added. One example of a security protocol for data packets includes IPSec (IP Security), as described in part by RFC 2401, entitled "Security Architecture for the Internet Protocol," dated November 1998. With IPSec, the portion of the packet between the security header and trailer is encrypted according to a predetermined encryption and/or authentication algorithm. With encryption, the IP packet itself can be said to be "scrambled."

Thus, in the encapsulation of a stimulus message, the stimulus message may remain unchanged or it may be scrambled. The encapsulated packet may itself be subjected to encryption according to a security protocol. Decapsulating a packet includes extracting the stimulus message from the packet. If scrambled, the stimulus message may also be unscrambled.

As shown in FIG. 3B, the packet 112 communicated over the data network 12 is received by the interface device 16. The packet 112 includes an IP header 114, a UDP header 116 and a payload section 118 containing a stimulus message in the predetermined stimulus language, such as one generated by the telephone exchange system 14. The packet 112 is then decapsulated by the interface device 16 and the extracted stimulus message 110, which remains in the predetermined stimulus language, is sent to the stimulus telephone 18.

A similar process for inbound and outbound messages and packets may be performed by the interface device 30 of FIG. 1B, which is attached to the telephone exchange system 14.

Example stimulus messages include the following: key press, display, ring, off-hook, on-hook, user input, control information, status update, and so forth. Examples of stimulus control information that may be sent from the telephone exchange system to a stimulus telephone includes time and date download, reset, configuration commands, handset volume control, ringer volume control, handset connect/disconnect, mute/unmute, open/close audio stream, headset connect/disconnect, and other commands. Different interfaces may provide different types of stimulus messages, and embodiments of the invention may be employed with any of the various types of stimulus messaging protocols between stimulus devices (e.g., a stimulus telephone and a telephone exchange system).

Figure 4:
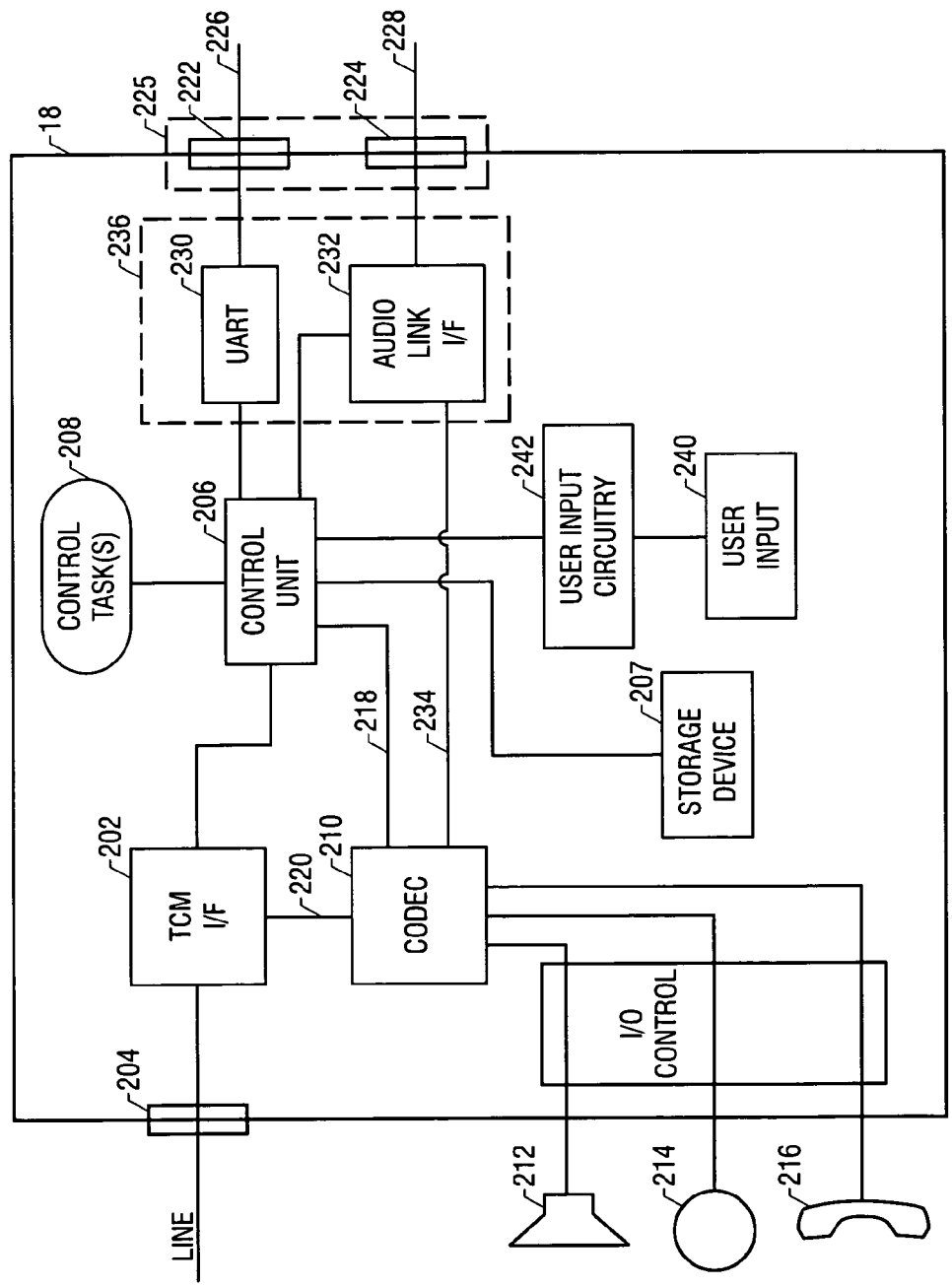
FIG. 4 is a block diagram of a stimulus telephone in accordance with one embodiment for use in the telephony system of FIG. 1A or 1B.

Referring to FIG. 4, components of a stimulus telephone 18 are illustrated. The stimulus telephone 18 includes a line interface 202 that is coupled to a line port 204 for communicating over a line, which may be the link 20 in FIG. 1, for example. The line interface 202 may include a TCM interface. The line interface 202 is coupled to a control unit 206, which may be run under control of one or more control tasks 208. The line interface 202 and control unit 206 are also coupled to a coder/decoder (CODEC) 210. The CODEC may be implemented in a digital signal processor (DSP) or as a software routine executable by the control unit 206. The CODEC 210 may be coupled through an input/output (I/O) control circuit to a speaker 212, a microphone 214, and a handset 216 for providing audio communications to the user. A link 218 between the control unit 206 and the CODEC 210 is a control path, while a link 220 between the line interface 202 and the CODEC 210 is an audio path.

The stimulus telephone 18 may also include a second set of ports 222 and 224 (collectively referred to as an "interface 236"). The port 222 is coupled to a universal asynchronous receiver-transmitter (UART) 230 that is capable of communicating over a control signaling link 226, while the port 224 is coupled to an audio link interface 232 that is capable of communicating over an audio data link 228. Collectively, the ports 222 and 224 may be referred to as a "port 225". In further embodiments, instead of the UART 230, a universal synchronous asynchronous receiver-transmitter (USART) or another type of input/output (I/O) interface may be used instead. The control signaling link 226 may be used to communicate control signaling, such as stimulus messages. The audio data link interface 232 may include a four-wire synchronous interface, by way of example. Both the UART 230 and the audio data link interface 232 are coupled to the control unit 206. In addition, the audio data link interface 232 is coupled to the CODEC 210.

The stimulus telephone 18 includes various user input components 240, such as buttons on a keypad and other selectors. Buttons in the user input components 240 may include numeric buttons, speed dial buttons, hold buttons, transfer buttons, speaker buttons, and so forth. The other selectors may include control selectors to perform configuration operations, for example. The user input components 240 may also include a display and a ringer. The user input components 240 are coupled to user input circuitry 242, which may in turn be coupled to the control unit 206.

Figure 5:
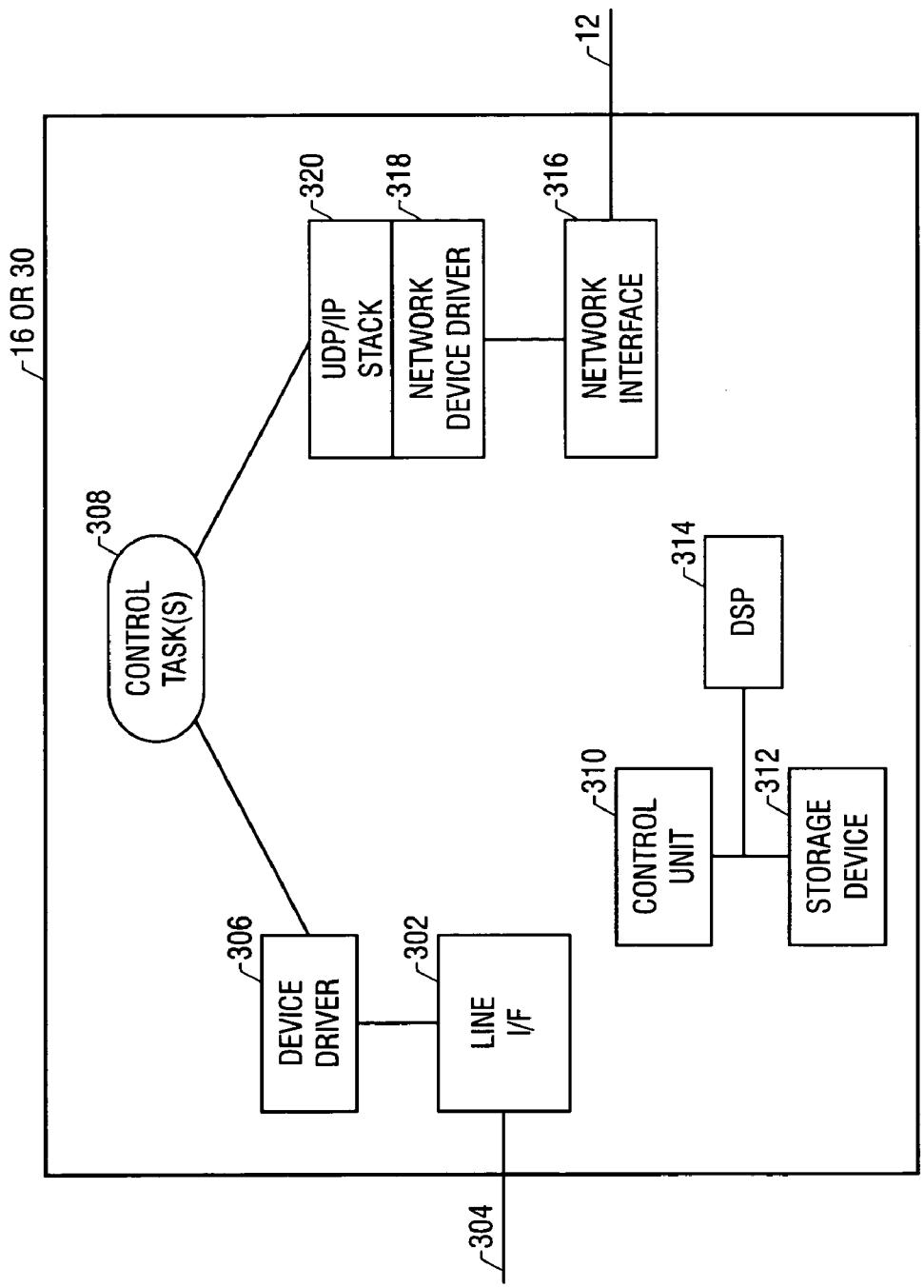
FIG. 5 is a block diagram of components in an interface device coupled between the stimulus telephone and the data network in accordance with one embodiment.

Referring to FIG. 5, components of the interface device 16 or 30 are illustrated. The interface device 16 or 30 may include a line interface 302 that is coupled over a link 304 to a stimulus device (e.g., a stimulus telephone or exchange system). The link 304 may be one or more links (such as 226 and 228 in FIG. 4) coupled to a port of the stimulus telephone 18 (e.g., port 225) or to a port of a telephone exchange system. Alternatively, the link 304 may be coupled to the TCM port 204 of the stimulus telephone 18 (FIG. 4) or the TCM port of the telephone exchange system.

Layers above the line interface 302 include a device driver 304 that is in communication with one or more control tasks 308. The interface 308 may also be referred to as a "digital interface" capable of communicating digital signals with a stimulus device. The control tasks 308 are executable on a control unit 310. The interface device 16 or 30 also includes a storage device 312 coupled to the control unit 310, and optionally, a DSP 314.

The interface device 16 or 30 further includes a network interface 316 that is coupled to the packet-based data network 12. The network interface 316 may include a network controller or a network interface card. Above the network interface 316 is a network device driver 318 and a UDP/IP stack 320. Data packets received over the data network 12 is passed through the network interface 316 up through the network device driver 318 to the UDP/IP stack 320, which decapsulates the packets into control messages and data. The control messages and data are sent to the one or more control tasks 308, which are application layer routines.

Similarly, outbound control messages and data from the control tasks 308 are communicated to the UDP/IP stack 320, which encapsulates the control messages and data into packets. The packets are sent through the network device driver 318 and the network interface 316 to the data network 12.

In accordance with some embodiments, the one or more control tasks 308 in the interface device 16 or 30 do not translate stimulus messages received through the stimulus phone interface 302 into a different format. Rather, the data representing the stimulus message remains in the same format and language and are encapsulated and included in the payload section of IP packets. Thus, there is no translation from a stimulus language into another language. By avoiding the translation of stimulus messages into other forms, loss of information which may result in loss of features may be avoided. Also, without performing the translation into different form, forward compatibility is enhanced since little or no reprogramming is needed in the interface device to upgrade to new telephone features. A further advantage associated with not having to translate stimulus messages into other forms includes the reduced complexity of the control tasks 308 since existing UDP and IP stacks may be used to perform the encapsulation and decapsulation.

Figure 6:
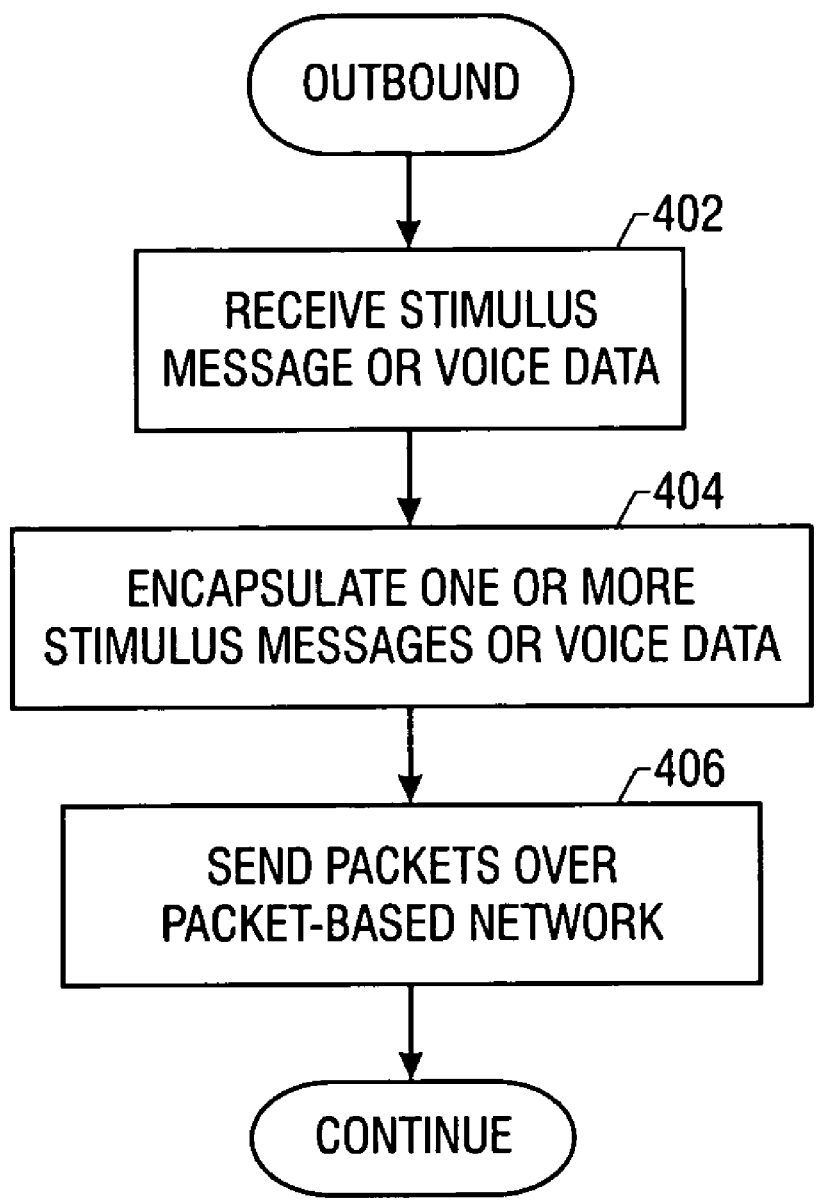
FIG. 6 is a flow diagram for processing outbound messages, in the interface device of FIG. 4, from a stimulus telephone to the data network.

Referring to FIG. 6, the processing of an outbound message by a control task 308 (FIG. 5) in the interface device 16 or 30 is illustrated. The control task 308 receives a stimulus message or voice data (at 402) through the line interface 302. Next, the control task 308 encapsulates (at 404) the one or more stimulus messages or voice data into one or more IP packets. In the encapsulation process, the destination address of the destination device is determined. If there are more than one destination device, then the control task 308 determines the IP address of the destination device. Determination of the destination IP address is accomplished differently in the interface device 16 and the interface device 30 since plural stimulus telephones are associated with a single telephone exchange system. The interface device 16 coupled to a stimulus telephone 18 knows that the destination system is usually the telephone exchange system 14. Thus, in the interface device 16, the IP address of the telephone exchange system 14 responsible for controlling the stimulus telephone may be stored locally in the storage device 312 of the interface device 16 and retrieved for inclusion as the destination IP addresses.

However, the interface device 30 has to determine which of plural stimulus telephones 18 is the destination. This may be accomplished by the control task 308, which determines the line (one line per stimulus telephone) that a stimulus message is targeted to. From this, the control task 308 can determine the corresponding destination IP address from a local directory stored in the storage device 312 in the interface device 30. The determined IP address is provided as the destination address in the IP header of an outbound IP packet. If appropriate, UDP port numbers may also be added into the UDP header.

Once encapsulated, the one or more packets containing the stimulus message or voice data are sent (at 406) over the data network 12 to the specified IP destination address.

Figure 7:
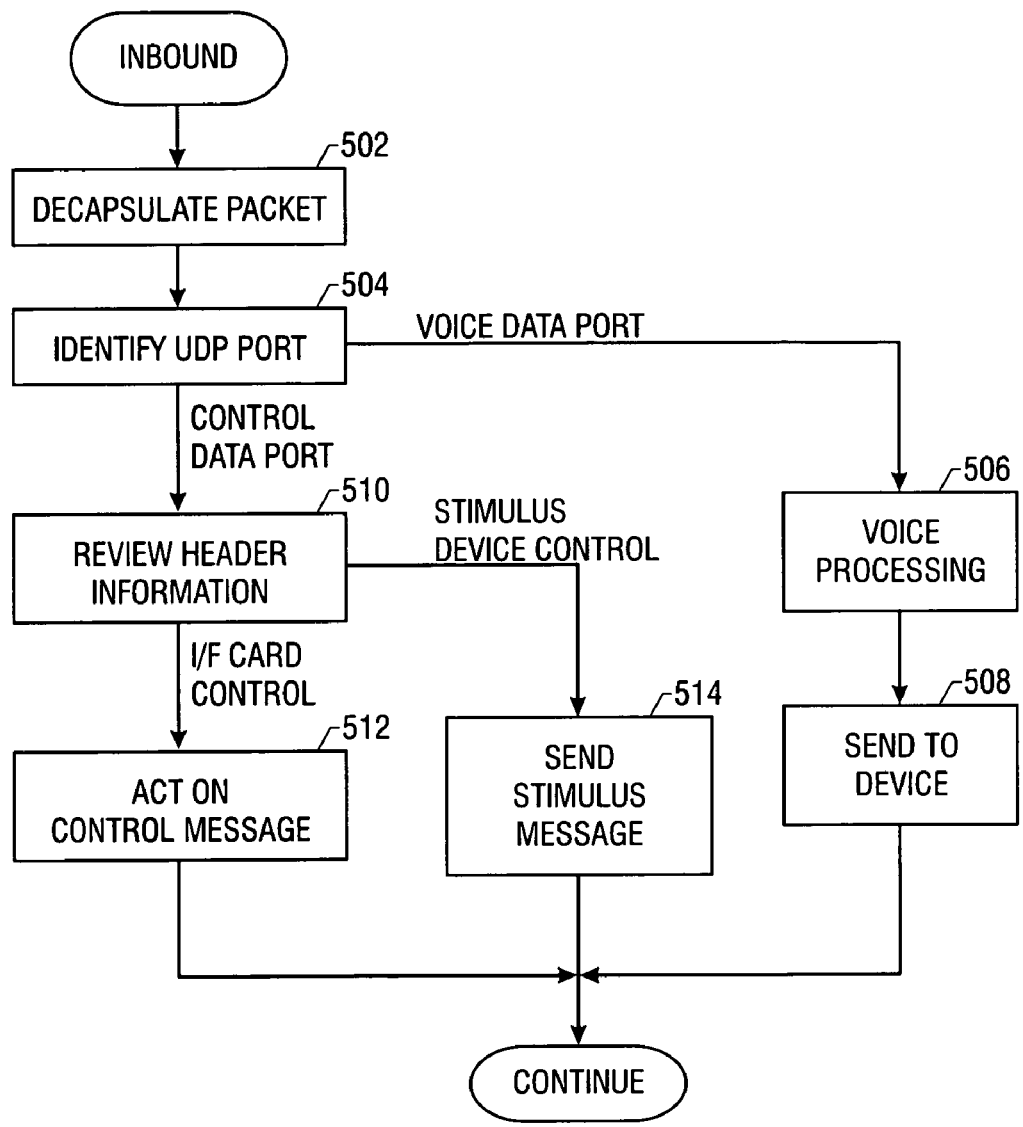
FIG. 7 is a flow diagram for processing inbound messages, in the interface device, from the data network to the stimulus telephone.

Referring to FIG. 7, processing of inbound packets from the data network 12 (with the source being the interface device coupled to the telephone exchange system 14 or a stimulus telephone is shown). The processing may also be performed by the control tasks 308. Upon receipt of the packet, the control task 308 decapsulates the packet (at 502). The received IP packet may include an IP header with a source address corresponding to the originating device. This source address may be compared to a local list of source addresses to determine the source device. The packet may also include a UDP port. Different UDP port numbers may be used to identify different destinations within the interface device 16 or 30.

The control task 308 identifies (at 504) the UDP port number contained in the UDP header of the IP packet. A first UDP port number may be associated with voice data, which causes the control task 308 to perform voice processing (at 506). In the interface device 16, the processed voice is then sent (at 508) to the stimulus telephone. In the interface device 30, the processed voice is sent to tasks in the telephone exchange system 14 for further processing, such as to transmit to other stimulus telephone that is part of an established call.

If the UDP port identified (at 504) corresponds to the control data port, then predetermined header information of the message contained in the payload section of the IP packet is reviewed (at 510) to determine whether the message is associated with stimulus device (telephone or telephone exchange system) control or interface device control.

If associated with interface device control, the control task 308 acts (at 512) on the control message to perform control functions in the interface device 16 or 30. Such functions may include diagnostic tests, reading and/or writing of configuration information, and other tasks that may be performed internally in the interface device 16 or 30.

If the predetermined header information associated with the stimulus message in the payload section of the IP packet indicates stimulus device control, the control task 308 sends (at 514) the stimulus message to the stimulus device through the line interface 302 and the link 304.

An improved system and method is thus provided for carrying stimulus messaging between stimulus telephones and a telephone exchange system. By using a packet-based data network to carry stimulus messaging, separate lines used for data services and telephony services may be avoided, thereby reducing the costs associated with setting up an office facility. Also, due to the wide availability of high performance packet-based data networks, connection of a stimulus telephone at a remote site, such as a remote office location or a home office location, to a telephone exchange system at a main office, is made more convenient. One possibility is to couple the stimulus telephone over a LAN to the main office telephone exchange system. Alternatively, the remote stimulus telephone may be coupled over a public network, such as the Internet, to the telephone exchange system at the main office. If coupled over the public network, some type of encryption and authentication may be performed to provide security.

The various system layers, routines, or modules may be executable control units (such as control units 206 and 310 in the stimulus telephone 18 and interface device 16, respectively. Each control unit may include a microprocessor, a microcontroller, a processor card (including one or more microprocessors or controllers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit cause the corresponding system to perform programmed acts.

The instructions of the software layers, routines or modules may be loaded or transported to the corresponding system or device network element in one of many different ways. For example, code segments including instructions stored on floppy disks, CD or DVD media, a hard disk, or transported through a network interface card, modem, or other interface device may be loaded into the system and executed as corresponding software layers, routines or modules. In the loading or transport process, data signals that are embodied in carrier waves (transmitted over telephone lines, network lines, wireless links, cables, and the like) may communicate the code segments, including instructions, to the system. Such carrier waves may be in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. Apparatus for use in a telephony system, comprising:
   a digital interface for connection with a stimulus telephone;
   a packet interface for communicating with a packet-based network; and
   a controller to receive stimulus control information according to a stimulus language from the digital interface and to encapsulate the stimulus control information into one or more packets for transmission over the packet-based network through the packet interface, wherein the stimulus control information is encapsulated into the one or more packets without providing messaging according to a language different from the stimulus language in the one or more packets.

2. The apparatus of claim 1, wherein the controller encapsulates the stimulus control information into an Internet Protocol packet.

3. The apparatus of claim 1, wherein the digital interface includes a UART interface.

4. The apparatus of claim 1, wherein the digital interface includes a time compression multiplex interface.

5. The apparatus of claim 1, wherein the controller adds a destination address of a telephone switch system into the one or more packets.

6. The apparatus of claim 1, wherein the controller adds a destination address of a second stimulus telephone into the one or more packets.

7. The apparatus of claim 1, wherein the stimulus control information remains in the stimulus language after encapsulation.

8. The apparatus of claim 1, wherein the controller encapsulates the stimulus control information by adding header information according to a network protocol in the one or more packets, the stimulus control information encapsulated in the payload section of the one or more packets without providing messaging of a language different from the stimulus language in the payload section.

9. The apparatus of claim 8, wherein the network protocol header information includes an Internet Protocol header.

10. The apparatus of claim 8, wherein the controller adds further header information according to a transport protocol into the one or more packets.

11. The apparatus of claim 10, wherein the further header information includes a User Datagram Protocol header.

12. The apparatus of claim 1, wherein the controller encrypts the one or more packets.

13. The apparatus of claim 1, further comprising a receiver to receive the one or more packets, the receiver including an element to decapsulate the one or more packets to extract the stimulus control information.

14. The apparatus of claim 13, wherein the receiver is associated with a second stimulus device, and wherein the extracted stimulus control information is in a native stimulus language of the second stimulus device.

15. The apparatus of claim 1, wherein the stimulus control information includes at least one of hook state information and key press event information, the controller to encapsulate the at least one of the hook state information and key press event information into the one or more packets.

16. The apparatus of claim 1, wherein the stimulus control information includes a command selected from the group consisting of a handset volume control command, a handset connect/disconnect command, and a ringer activation command, the controller to encapsulate the command selected from the group consisting of the handset volume control command, the handset connect/disconnect command, and the ringer activation command.

17. The apparatus of claim 1, further comprising an interface card adapted to be inserted into a slot of the stimulus telephone, the interface card comprising the digital interface, the packet interface, and the controller.

18. The apparatus of claim 1, wherein the digital interface is adapted to exchange the stimulus control information with the stimulus telephone.

19. The apparatus of claim 1, wherein the stimulus control information contains a command according to a stimulus protocol selected from the group consisting of off-hook, on-hook, handset volume control, handset connect, and handset disconnect, the controller to encapsulate the command selected from the group consisting of off-hook, on-hook, handset volume control, handset connect, and handset disconnect in the one or more packets.

20. The apparatus of claim 1, further comprising a receiver to receive one or more inbound packets containing inbound stimulus control information, the controller to decapsulate the one or more inbound packets to extract the inbound stimulus control information.

21. The apparatus of claim 1, wherein the digital interface is adapted to communicate with the stimulus telephone through an input/output port of the stimulus telephone.

22. Apparatus for use in a telephony system, comprising:
a digital interface for connection with a stimulus telephone;
a packet interface for communicating with a packet-based network; and
a controller to receive stimulus control information from the digital interface and to encapsulate the stimulus control information into one or more packets for transmission over the packet-based network through the packet interface,
wherein the controller also scrambles the stimulus control information before encapsulation.

23. A method for use in a telephony system, comprising:
communicating stimulus control information with a stimulus telephone through a first interface connected to the stimulus telephone, and packet information with a packet-based network through a packet interface;
encapsulating stimulus control information according to a stimulus language received from the first interface into at least one packet, wherein the stimulus control information is encapsulated into the at least one packet without providing any messaging according to a language different from the stimulus language in the at least one packet; and
transmitting the encapsulated stimulus control information in the at least one packet from the packet interface over the packet-based network.

24. The method of claim 23, further comprising:
decapsulating one or more packets received from the packet interface and containing stimulus control information; and
transmitting the stimulus control information of the decapsulated one or more packets to the first interface.

25. The method of claim 23, wherein encapsulating the stimulus control information includes inserting the stimulus control information in its native stimulus language into a payload of the at least one packet without translating the stimulus control information into a different language and without providing the stimulus control information in messaging according to a language different from the native stimulus language.

26. The method of claim 25, wherein encapsulating the stimulus control information includes adding a network protocol header to the stimulus control information.

27. The method of claim 26, wherein encapsulating the stimulus control information includes adding an Internet Protocol header.

28. The method of claim 27, wherein encapsulating the stimulus control information further includes adding a User Datagram Protocol header.

29. The method of claim 23, further comprising scrambling the stimulus control information before encapsulating.

30. The method of claim 23, further comprising encrypting the at least one packet.

31. The method of claim 23, further comprising providing an interface card to be inserted into a slot of the stimulus telephone, the interface card having the first interface and the packet interface,
wherein encapsulating the stimulus control information and transmitting the encapsulated stimulus control information and transmitting the encapsulated stimulus control information is performed by the interface card.

32. The method of claim 23, wherein encapsulating the stimulus control information comprises encapsulating a command according to a stimulus protocol selected from the group consisting of off-hook, on-hook, handset volume control, handset connect, and handset disconnect.

33. The method of claim 23, wherein communicating the stimulus control information comprises communicating the stimulus control information through the first interface and an input/output port of the stimulus telephone.

34. An article including one or more machine-readable storage media containing instructions for call control in a telephony system, the instructions when executed causing a device to:
receive stimulus control information according to a stimulus language from a first interface connected to a stimulus telephone;
encapsulate the stimulus control information into one or more UDP/IP packets, wherein the stimulus control information is encapsulated into the one or more UDP/IP packets without providing functional messaging according to a language different from the stimulus language in the one or more UDP/IP packets; and
communicate the one or more UDP/IP packets to a packet-based data network.

35. The article of claim 34, wherein the one or more storage media contain instructions that when executed causes the device to:
receive a packet containing stimulus control information according to the stimulus language;
decapsulate the packet to extract the stimulus control information from the received packet; and
communicate the extracted stimulus control information to the first interface.

36. The article of claim 34, wherein encapsulating the stimulus control information according to the stimulus language comprises encapsulating one of an off-hook stimulus command, on-hook stimulus command, handset volume control stimulus command, handset connect stimulus command, and handset disconnect stimulus command.

37. The article of claim 34, wherein receiving the stimulus control information according to the stimulus language comprises receiving the stimulus control information according to the stimulus language through the first interface and an input/output port of the stimulus telephone.

38. An article including one or more machine-readable storage media containing instructions for call control in a telephony system, the instructions when executed causing a device to:
receive at least one packet containing a stimulus message according to a first language, wherein the received at least one packet does not contain messaging according to another telephony language different from the first language;
decapsulate the at least one packet to extract the stimulus message according to the first language; and
send the stimulus message according to the first language to a first interface connected to a stimulus telephone.

39. The article of claim 38, further containing instructions that when executed causes the device to:
receive a stimulus message according to the first language through the first interface connected to the stimulus telephone; and
encapsulate the stimulus message according to the first language into at least one packet.

40. The article of claim 38, wherein receiving the at least one packet containing the stimulus message comprises receiving the at least one packet containing stimulus message containing at least a command selected from the group consisting of off-hook, on-hook, handset volume control, handset connect, and handset disconnect.

41. The article of claim 38, wherein sending the stimulus message comprises sending the stimulus message to the first interface and an input/output port of the stimulus telephone.

42. Apparatus for use in a telephony system, comprising:
a digital interface for connection with a stimulus telephone;
a packet interface for communicating with a packet-based network;
a controller to receive stimulus control information from the digital interface and to encapsulate the stimulus control information into one or more packets for transmission over the packet-based network through the packet interface; and
a receiver to receive one or more inbound packets containing inbound stimulus control information, the controller to decapsulate the one or more inbound packets to extract the inbound stimulus control information, wherein each of the one or more inbound packets contains a User Datagram Protocol (UDP) port number, the controller to determine from the UDP port number whether the corresponding inbound packet contains voice data or stimulus control information.

43. A method for use in a telephony system, comprising:
communicating stimulus control information with a stimulus telephone through a first interface connected to the stimulus telephone, and packet information with a packet-based network through a packet interface;
encapsulating stimulus control information received from the first interface; and
transmitting the encapsulated stimulus control information as at least one packet to the packet interface;
decapsulating one or more packets received from the packet interface and containing stimulus control information; and
transmitting the stimulus control information of the decapsulated one or more packets to the first interface, wherein each of the received one or more packets contains a User Datagram Protocol (UDP) port number, the method further comprising determining from the UDP port number whether the corresponding received packet contains voice data or stimulus control information.

44. An apparatus for use in a telephony system, comprising
means for receiving a stimulus message through a first interface connected to a stimulus telephone;
means for encapsulating the stimulus message into at least one packet;
means for transmitting the at least one packet to a packet-based network; and
means for scrambling the stimulus message before encapsulating.

45. The apparatus of claim 44, wherein the stimulus message contains at least a command selected from the group consisting of off-hook, on-hook, handset volume control, handset connect, and handset disconnect, the means for encapsulating to encapsulate the command selected from the group consisting of off-hook, on-hook, handset volume control, handset connect and handset disconnect.

* * * * *